C. M. NELSON.
AUTOMOBILE HEATER.
APPLICATION FILED APR. 20, 1917.
1,285,324.
Patented Nov. 19, 1918.
2 SHEETS—SHEET 2.
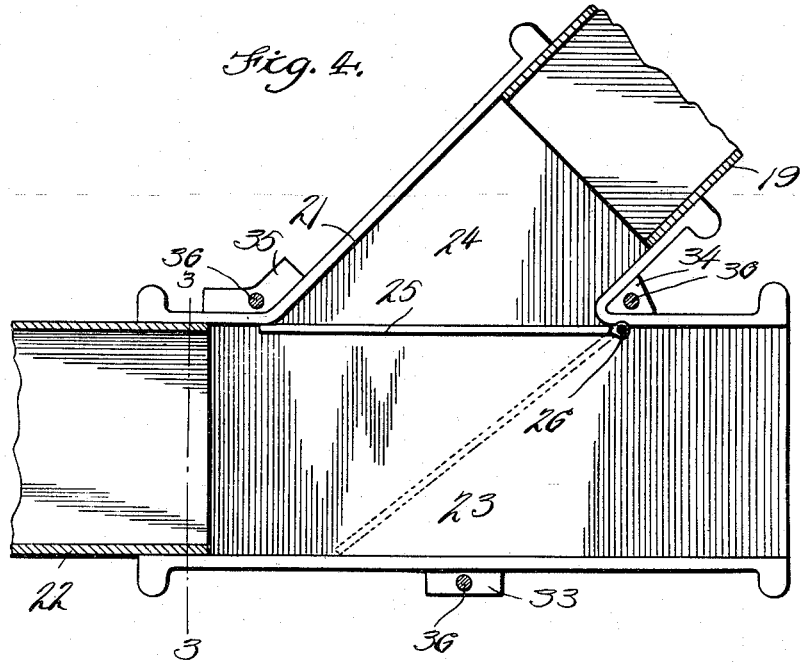
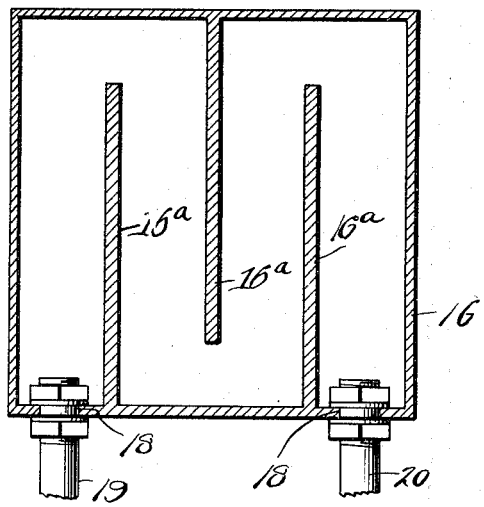
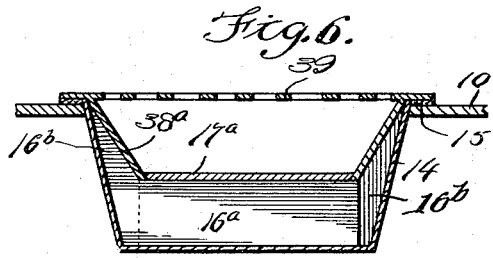
INVENTOR
Christian M. Nelson.
WITNESSES
BY
ATTORNEY

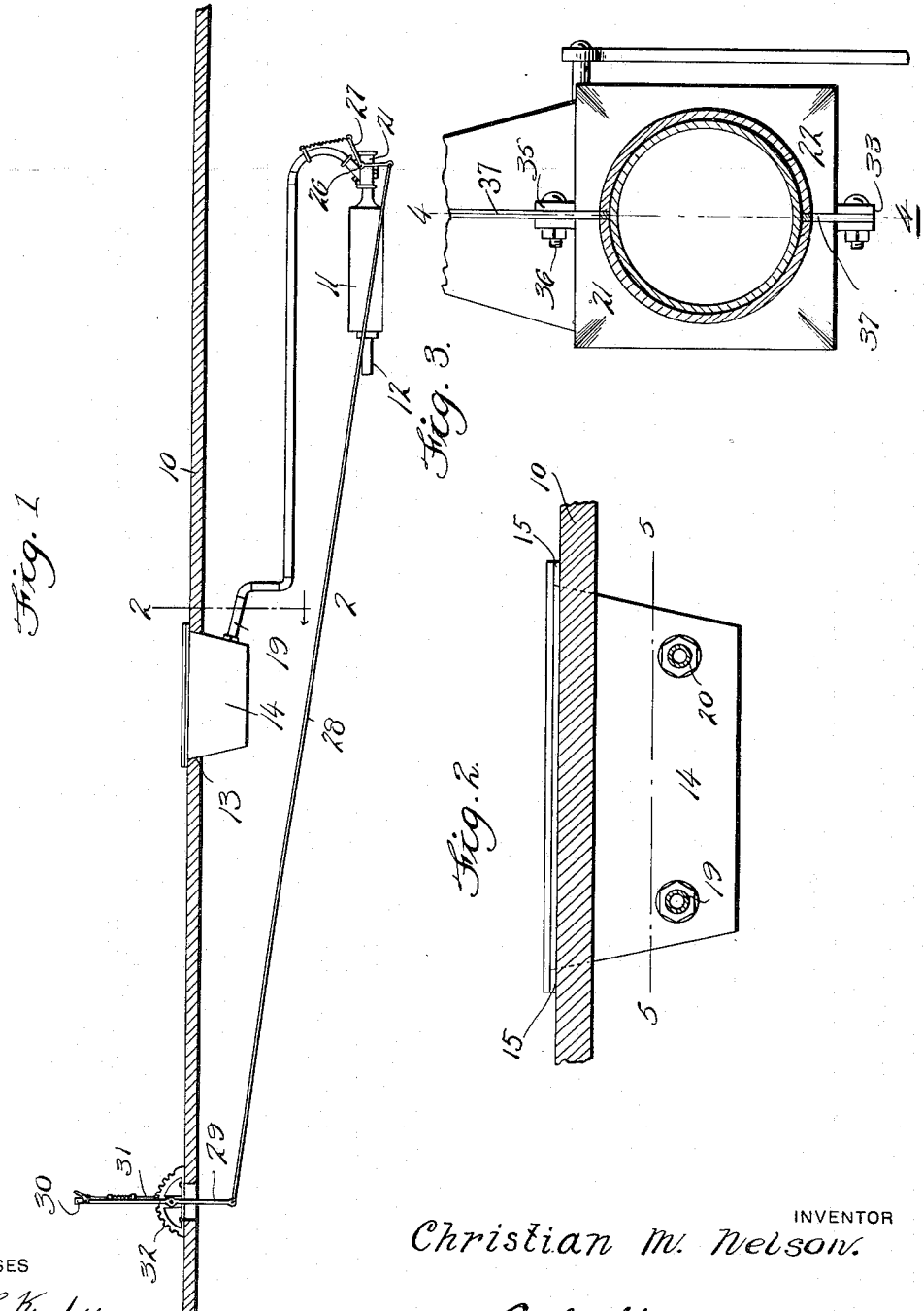

UNITED STATES PATENT OFFICE.

CHRISTIAN M. NELSON, OF FOND DU LAC, WISCONSIN.

AUTOMOBILE-HEATER.

1,285,324.   Specification of Letters Patent.   Patented Nov. 19, 1918.

Application filed April 20, 1917. Serial No. 163,477.

*To all whom it may concern:*

Be it known that I, CHRISTIAN M. NELSON, a citizen of the United States, residing at Fond du Lac, in the county of Fond du Lac and State of Wisconsin, have invented certain new and useful Improvements in Automobile-Heaters, of which the following is a specification.

This invention relates to automobile heaters, and it more particularly relates to the class of heaters in which the products of combustion from the engine are utilized for heating the interior of an automobile.

One of the objects of this invention is to provide a device of this character which may be attached to an automobile of any ordinary construction without detrimentally affecting the automobile.

Another object of the invention is to provide a device of this character which is exceedingly simple and comparatively inexpensive.

Another object is to provide an automobile heater of this character which is thoroughly efficient and easily controlled.

Another object is to provide a device of this character which may be manufactured at a comparatively slight cost and which is thoroughly economical in all respects.

Other objects may become apparent by the reading of the following description and claims.

The foregoing objects are attained by the construction illustrated in the accompanying drawings, in which:

Figure 1 is a side elevation view of my improved automobile heater attached to the floor of an automobile which latter is shown in section;

Fig. 2 is an enlarged vertical sectional view, the section being taken on the line 2—2, Fig. 1;

Fig. 3 is an enlarged vertical sectional view taken on the line 3—3 of Fig. 4;

Fig. 4 is an enlarged longitudinal vertical sectional view taken on the line 4—4 of Fig. 3;

Fig. 5 is a horizontal sectional view taken on the line 5—5 of Fig. 2; and

Fig. 6 is a detail vertical sectional view through the register box or casing.

Referring to these drawings in detail, in which similar reference characters correspond with similar parts throughout the several views, the reference character 10 designates the floor of an automobile, while 11 designates a muffler which may be of ordinary construction and which is connected with the usual exhaust pipe 12 which is designed to be connected with the engine, not shown.

The floor 10 is provided with an aperture 13 in which is seated the register box or casing 14, said casing being provided with horizontal flanges 15 which rest upon the automobile floor.

A plurality of partitions 16ª are disposed within the lower portion of the casing 14 and have a staggered arrangement, as shown most clearly in Fig. 5. The partitions 16ª are vertically disposed and make close connection at their lower edges with the bottom of the casing 14, and by reason of their staggered arrangement a tortuous or circuitous passageway is formed. The partitions make connection at their outer ends with the respective sides of the casing 14 and their inner ends are spaced from the remaining sides of the casing. A horizontal partition 17ª is placed upon the upper edges of the vertical partitions 16ª and plates 38ª connect opposite edges of the horizontal partition with the upper edges of the adjacent sides of the casing 14. The angular spaces formed between the plates 38ª and the adjacent sides of the casing receive vertical extensions 16ᵇ projecting from the respective ends of the partitions 16ª which are in contact with the side walls of the casing 14. The top of the casing is closed by means of a grate 39 which rests upon the outer supporting flange 15 and has the upper edges of the plate 38ª in contact therewith.

The rear wall of the register box 14 is apertured as at 18 for the reception of an inlet pipe 19 and an outlet pipe 20, which pipes communicate with the circuitous passage or flue within the register box.

The pipe 19 may be curved and extended in any desired or required direction in order to connect with a valve casing or cut-off casing 21, which latter is connected to the muffler 11, either directly, or by means of a section of pipe 22 such as illustrated in Fig. 4.

The shutter casing 21 is preferably formed in two counterpart sections each of which is preferably Y-shaped, or consisting of a tubular element 23 and a lateral branch 24, which latter communicates with the interior of the tubular section 23 when it is desirable to direct the products of combustion through said branch and through the pipe 19. However, such communication may be interrupted and established at will by means of a shutter 25 secured on a rod 26 which is journaled in the opposite side walls of the shutter casing 21, as illustrated in Figs. 1 and 4. On one end of the rod 26 is secured a bell crank lever 27 having a depending arm which is pivotally connected to an actuating rod 28, and said rod is pivotally connected to an operating lever 29 provided with a handle 30 and with a latch mechanism generally designated by the numeral 31. The lever 29 is pivotally mounted adjacent to a toothed segment 32, mounted on the floor of the automobile, and coöperative with the lever 30 and latch 31 in the well known manner, so as to actuate and retain the bell crank 27 and shutter 25 in any desired one of the positions to which it may be adjusted. By this manipulative device, the shutter may be moved to and detained in either the full line position or the dotted line position illustrated in Fig. 4, or to any of the several intermediate positions. From the foregoing, it is obvious that when the shutter is in the full line position (see Fig. 4), exhaust from the muffler 11 passes through the pipe 22 and casing 23 and escapes to the open air through the rear end of said casing; but, when the shutter is in the dotted line position (see Fig. 4), the exhaust or products of combustion from the engine cannot pass through the open end of the casing 23, but are forced to pass, by the shutter 25, through the branch 24, thence through the pipe 19, thence through the circuitous passage between the walls and vertical partitions of the register box, and finally out into the open air, through the escape pipe 20.

In order that this device may be manufactured with the least expense, I prefer to form the shutter casing of two counterpart or complementary sections each of which is provided with apertured retaining lugs 33, 34 and 35, through which bolts 36 are passed, said bolts being provided with nuts with which they coöperate in holding the sections of the casing together.

In order that the products of combustion shall not escape through the joint between the counterpart sections or halves thereof, I provide suitable packing strips 37 between the opposing edges of said sections or halves.

What I claim as my invention is:

1. A radiator comprising a casing provided with vertical partitions extending nearly across the casing but terminating short of the extent across the casing, said partitions being arranged in such relation as to provide a circuitous passage-way, a grate extending horizontally across the top of the casing, a horizontal partition on the tops of said vertical partitions, and downwardly and inwardly converging plates connecting said grate with said horizontal partition.

2. A casing to be positioned in an opening formed in the floor of an automobile, a horizontal plate within the casing parallel with and spaced from the bottom and sides of the casing, side plates connecting the upper edges of the sides of the casing with the contiguous edges of the horizontal plate inclosing acute angled spaces, vertical partitions between the bottom of the casing and the horizontal plate and having a staggered arrangement to form a tortuous passage-way having an inlet at one end and an outlet at the opposite end, each of the partitions having an upper tapered extension formed at its outer end projecting into the angular space formed between the side plates and the sides of the casing, and a grating closing the top of the casing.

In testimony whereof I affix my signature in presence of two witnesses.

CHRISTIAN M. NELSON.

Witnesses:
 JELID B. PERKINS,
 S. L. LITTLE.

Copies of this patent may be obtained for five cents each, by addressing the "Commissioner of Patents, Washington, D. C."